US010550462B1

(12) United States Patent
Wessels et al.

(10) Patent No.: US 10,550,462 B1
(45) Date of Patent: Feb. 4, 2020

(54) COATING WITH DENSE COLUMNS SEPARATED BY GAPS (71) Applicant: United Technologies Corporation, Farmington, CT (US)

(72) Inventors: Kaylan M. Wessels, West Hartford, CT (US); Brian T. Hazel, Avon, CT (US); Xuan Liu, Glastonbury, CT (US); R. Wesley Jackson, West Hartford, CT (US); Elisa M. Zaleski, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/699,265

(22) Filed: Sep. 8, 2017

(51) Int. Cl.
B32B 7/02 (2019.01)
C23C 4/134 (2016.01)
C23C 4/11 (2016.01)
F01D 25/00 (2006.01)
C09D 1/00 (2006.01)

(52) U.S. Cl.
CPC ............... C23C 4/134 (2016.01); C09D 1/00 (2013.01); C23C 4/11 (2016.01); F01D 25/005 (2013.01); F05D 2220/32 (2013.01); F05D 2230/312 (2013.01); F05D 2230/90 (2013.01)

(58) Field of Classification Search
CPC .... B42C 9/0031; Y10S 156/908; B32B 27/02
See application file for complete search history.

(56) References Cited

U.S. PATENT DOCUMENTS

| 5,558,922 | A | 9/1996 | Gupta et al. |
| 6,703,137 | B2 | 3/2004 | Subramanian |
| 8,192,831 | B2 | 6/2012 | Rosenzweig et al. |
| 8,389,106 | B2 | 3/2013 | Rosenzweig et al. |
| 8,586,172 | B2 | 11/2013 | Rosenzweig et al. |
| 8,658,291 | B2 | 2/2014 | Kirby et al. |
| 8,859,052 | B2 | 10/2014 | Kirby et al. |
| 9,022,743 | B2 | 5/2015 | Dierberger |
| 9,556,505 | B2 | 1/2017 | Rosenzweig et al. |
| 2006/0289405 | A1 | 12/2006 | Oberste-Berghaus et al. |
| 2009/0169914 | A1 | 7/2009 | Fu et al. |
| 2009/0280298 | A1 | 11/2009 | Rosenzweig et al. |
| 2010/0015350 | A1 | 1/2010 | Allen |
| 2013/0260132 | A1 | 10/2013 | Hazel et al. |
| 2015/0147524 | A1 | 5/2015 | Petorak |
| 2015/0159507 | A1 | 6/2015 | Sivaramakrishnan et al. |
| 2015/0167141 | A1 | 6/2015 | Rosenzweig et al. |
| 2016/0115818 | A1 | 4/2016 | Porob et al. |
| 2016/0115819 | A1 | 4/2016 | Nayak et al. |
| 2016/0168684 | A1 | 6/2016 | Brosnan et al. |
| 2016/0347671 | A1 | 12/2016 | Strock |
| 2017/0016104 | A1 | 1/2017 | Hazel et al. |
| 2017/0101875 | A1 | 4/2017 | Rosenzweig et al. |
| 2017/0145836 | A1 | 5/2017 | Sivaramakrishnan et al. |
| 2017/0152753 | A1 | 6/2017 | Serra et al. |

FOREIGN PATENT DOCUMENTS

| EP | 1295964 A2 | 3/2003 |
| EP | 3106541 A1 | 12/2016 |

OTHER PUBLICATIONS

Extended European Search Report for EP Application No. 18193204. 7, dated Dec. 5, 2018, 8 pages.
H. Chen, et al., "Tribological Properties of Nanostructured Zirconia Coatings Deposited by Plasma Spraying", from Wear 253 (2002), pp. 885-893.
T. Bhatia, et al., "Mechanisms of Ceramic Coating Deposition in Solution-Precursor Plasma Spray", from J. Mater. Res., vol. 17, No. 9, Sep. 2002, pp. 2363-2372.
M. Gell, et al., "Highly Durable Thermal Barrier Coatings Made by the Solution Precursor Plasma Spray Process", from Surface and Coatings Technology 177-178 (2004), pp. 97-102.
M. Gell, et al., "The Solution Precursor Plasma Spray Process for Making Durable Thermal Barrier Coatings", from Proceedings of GT2005, ASME Turbo Expo 2005, Jun. 6-9, 2005, pp. 1-7.
C. Delbos, et al., "Phenomena Involved in Suspension Plasma Spraying Part 2: Zirconia Particle Treatment and Coating Formation", from Plasma Chem Plasma Process (2006), pp. 393-414.
R. Siegert, "A Novel Process for the Liquid Feedstock Plasma Spray of Ceramic Coatings with Nanostructural Features" (2005), 191 pages.
O. Berghaus, et al., "Suspension Plasma Spraying of Nanostructured WC-12 Co Coatings", from Proceedings of the 2006 Int'l. Spray Conference 2006, 7 pages.
L. Xie, et al., "Formation of Vertical Cracks in Solution-Precursor Plasma-Sprayed Thermal Barrier Coatings", from Surface & Coatings Technology 201 (2006), pp. 1058-1064.
K. Van Every, et al., "An Investigation of the Processing Parameters for Suspension Plasma Spraying", from Materials Science & Technology 2006, Oct. 19, 2006, pp. 1-23.
C.R.C. Lima, et al., "Adhesion Improvement of Thermal Barrier Coatings with HVOF Thermally Sprayed Bond Coats", from Surface & Coatings Technology 201 (2007), pp. 4694-4701.
K. Van Every, et al., "Study of Suspension Plasma Sprayed Coatings for Thermal Barrier Applications", from 32nd Int'l. Conference on Advanced Ceramics & Composites, Daytona Beach 2008, pp. 1-29.
H. Kassner, et al., "Application of Suspension Plasma Spraying (SPS) for Manufacture of Ceramic Coatings", from Journal of Thermal Spray Technology, vol. 17(1), Mar. 2008, pp. 115-123.
K. Van Every, "Development and Evaluation of Suspension Plasma Sprayed Yttria Stabilized Zirconia Coatings as Thermal Barriers", Thesis/Dissertation Purdue University, May 2009, 205 pages.
Z. Tang, et al., "Novel Thermal Barrier Coatings Produced by Axial Suspension Plasma Spray", from Proceedings of Int'l. Thermal Spray Conference and Exposition, 2011, Hamburg Germany, 6 pages.

(Continued)

Primary Examiner — Lawrence D Ferguson
(74) Attorney, Agent, or Firm — Kinney & Lange, P.A.

(57) ABSTRACT

A strain-tolerant coating for use in gas turbine engines can include a plurality of dense, generally vertically-oriented columnar structures formed during deposition by preferential material accumulation, and a plurality of inter-columnar gaps separating the columnar structures. The columnar structures can include a plurality of randomly-oriented particle splats and can have a porosity of less than four percent.

20 Claims, 4 Drawing Sheets (56) References Cited

OTHER PUBLICATIONS

K Van Every, et al., "Column Formation in Suspension Plasma-Sprayed Coatings and Resultant Thermal Properties", from Journal of Thermal Spray Technology, vol. 20(4), Jun. 2011, pp. 817-828.
K. Van Every, et al., "Parametric Study of Suspension Plasma Spray Processing Parameters on Coating Microstructures Manufactured from Nanoscale yttria-Stabilized Zirconia", from Surface & Coatings Technology 206 (2012), pp. 2464-2473.
S. Mantry, et al., "Parametric Appraisal of Process Parameters for Adhesion of Plasma Sprayed Nanostructured YSZ Coatings Using Taguchi Experimental Design", from The Scientific World Journal, vol. 2013, Article ID 527491, 8 pages.
A. Ganvir, et al., "Comparative Study of Suspension Plasma Sprayed and Suspension High Velocity Oxy-Fuel Sprayed YSZ Thermal Barrier Coatings", from Surface & Coatings Technology 268 (2015) pp. 70-76.
K. Van Every, et al., "Evaluating Conditions for Manufacturing Suspension Plasma TBCs", from Int'l. Thermal Spray Conference 2015, May 11-14, 2015, pp. 1-42.
N. Curry, et al., "Performance Testing of Suspension Plasma Sprayed Thermal Barrier Coatings Produced with Varied Suspension Parameters", from Coatings 2015, 5, pp. 338-356.
Z. Tang, PhD, "Axial Suspension Plasma Spraying (ASPS) Its Development and Application", from Thermal Spray of Suspensions & Solutions Symposium (TS4), Dec. 2015, Montreal, Canada, pp. 1-33.
F. Toma, et al., "Demands, Potentials and Economic Aspects of Thermal Spraying with Aqueous Suspensions", from Thermal Spray of Suspensions & Solutions Symposium (TS4), Dec. 2-3, 2015, Montreal, Canada, 26 pages.
O. Berghaus, et al., "Suspension Plasma Spraying of Intermediate Temperature SOFC Components Using an Axial Injection DC Torch", from Materials Science Forum, 539, pp. 1332-1337.
K. Van Every, et al., "In-Flight Alloying of Nanocrystalline Yttria-Stabilized Zirconia Using Suspension Spray to Produce Ultra-Low Thermal Conductivity Thermal Barriers", from Int'l. Journal of Applied Ceramic Technology, pp. 1-24.
A. L. Vasiliev, et al., "Coatings of Metastable Ceramics Deposited by Solution-Precursor Plasma Spray: I. Binary $ZrO_2$-$Al_2O_3$ System", from Acta Materialia 54 (2006), pp. 4913-4920.
L. Xie, et al. "Identification of Coating Deposition Mechanisms in the Solution-Precursor Plasma-Spray Process using Model Spray Experiments", from Materials Science and Eng. A362 (2003), pp. 204-212.
O. Racek, et al., "Nanostructured and Conventional YSZ Coatings Deposited using APS and TTPR Techniques", from Surface & Coatings Technology 201 (2006), pp. 338-346.
X. Ma, et al. "Solution Precursor Plasma Spray: A Promising New Technique for Forming Functional Nanostructured Films and Coatings", from 28th Int'l. Conf. on Advanced Ceramics and Composites: B, 2004, pp. 381-387.
A. Jadhav, et al., "Thick Ceramic Thermal Barrier Coatings with High Durability Deposited using Solution-Precursor Plasma Spray", from Materials Science and Eng. A405 (2005), pp. 313-320.
P. Fauchais, et al., "Understanding of Suspension DC Plasma Spraying of Finely Structured Coatings for SOFC", from IEEE Transactions on Plasma Science, vol. 33, No. 2, (Apr. 2005), pp. 920-930.
C. Delbos, et al., "Influence of Powder Size Distributions on Microstructural Features of Finely Structured Plasma Sprayed Coatings", from High Technology Plasma Processing 8 (2004), pp. 397-406.
D. Chen, et al. "Thermal Stability of Air Plasma Spray and Solution Precursor Plasma Spray Thermal Barrier Coatings", from J. Am. Ceram. Soc. 90 [10], (2007), pp. 3160-3166.
Z. Chen, et al., "Air-Plasma Spraying Colloidal Solutions of Nanosized Ceramic Powders", from Journal of Materials Science 39 (2004), pp. 4171-4178.
O. Berghaus, et al., "Suspension Plasma Spraying of Nano-Ceramics Using an Axial Injection Torch", from Proceedings. Thermal Spray 2005: Thermal Spray Connects: Explore its Surfacing Potential, pp. 1434-1440.

COATING WITH DENSE COLUMNS SEPARATED BY GAPS

BACKGROUND

The present invention relates generally to coatings formed by plasma spray. More particularly, the present invention relates to a coating having dense columns separated by gaps.

Liquid carrier plasma spray techniques, such as suspension plasma spray and solution precursor plasma spray techniques, have been developed to produce coatings having generally vertically-oriented columnar structures, similar to those produced by electron beam-physical vapor deposition (EB-PVD), separated by inter-columnar gaps or cracks, which can increase tolerance to the effects of thermal cycling during operation. The columnar structures are formed during material deposition by preferential material accumulation on surface asperities on a substrate. The columnar structures are porous, having nano-size pores, and are separated by porosity bands or areas of low material accumulation, which can accommodate thermal expansion and contraction of the coating. While the columnar microstructures can improve strain tolerance, the intra-columnar porosity can compromise the durability and toughness of the coating. Prior art liquid carrier plasma spray techniques teach modifying spray parameters such as standoff distance (distance between the plasma spray torch and the substrate), to increase the coating density. However, increasing density in such manner can result in a more uniform deposition of particles on the substrate and the loss of strain-tolerant columnar structures formed by preferential material accumulation.

SUMMARY

A strain-tolerant coating for use in gas turbine engines can include a plurality of dense, generally vertically-oriented columnar structures formed during deposition by preferential material accumulation, and a plurality of inter-columnar gaps separating the columnar structures. The columnar structures can include a plurality of randomly-oriented particle splats and can have a porosity of less than four percent.

A method of forming a strain-tolerant coating can include providing first and second suspension feedstocks, simultaneously feeding the first and second suspension feedstocks to a plasma spray torch, and depositing the particles of the first and second suspension feedstocks on a substrate to form a first plurality of columnar structures of preferential material accumulation. The first suspension has particles of a first material suspended in a liquid medium. The second suspension has particles of a second material, different from the first material, suspended in a liquid medium. The columnar structures of the first plurality of columnar structures have a porosity of less than four percent.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

A strain-tolerant coating having high density columnar structures can be formed using a liquid carrier plasma spray technique that combines a conventional coating material with a second material capable of filling nanopores, which would otherwise form by the accumulation of the conventional material particles. The incorporation of the second material can increase the density of the coating matrix above that which has been obtained with single and mixed material coatings in the prior art while still retaining the columnar structures formed by preferential material accumulation. Increasing material density while preserving the columnar structures can improve coating durability and toughness, while maintaining the improved strain tolerance provided by inter-columnar gaps. While the present invention is particularly directed to the design of thermal barrier coatings, it will be understood by one of ordinary skill in the art that the dense columnar microstructure and method of manufacture disclosed has application outside of thermal barrier coatings, including but not limited to environmental barrier coatings for ceramic matrix composites, tribological or wear coatings, and thin-film solid oxide fuel cells.

Figure 1:
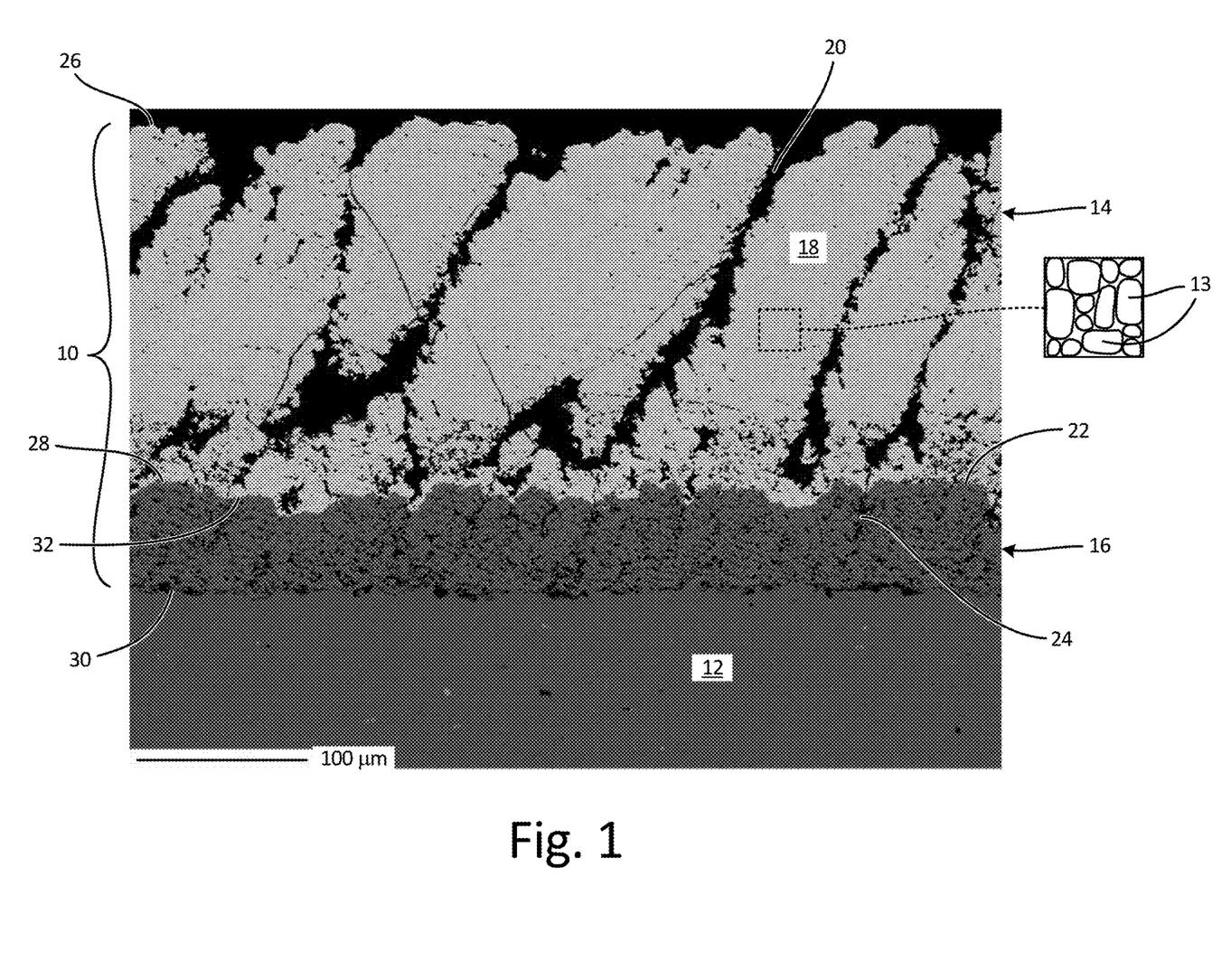
FIG. 1 is a perspective view of one embodiment of a coating.

FIG. 1 is a perspective view of one embodiment of coating system 10 as applied to substrate 12. Coating system 10 can include outer coating 14 and optional inner coating 16. Outer coating 14 can have dense generally vertically-oriented columnar structures 18 separated by inter-columnar gaps 20. Inner coating 16 can also have generally vertically-oriented columnar structures 22 separated by inter-columnar gaps 24. Inter-columnar gaps 20 and 24 can extend from an outermost layer 26, 28 of outer coating 14 and inner coating 16, respectively. In some embodiments, inter-columnar gaps 20 and 24 can extend a full thickness of outer coating 14 and inner coating 16, respectively. As used herein, the term "generally vertically-oriented" refers to columns extending from an innermost coating layer 30, 32 of inner and outer coatings 16 and 14 to the respective outermost coating layer 28, 26 of inner and outer coatings 16 and 14. Columnar structures 18 and 22 formed during deposition can be generally aligned with the spray angle, which can typically vary between 45° and 90° from the substrate. While the spray angle can be set to optimize mechanical properties of the coating, such as adhesion strength, complex component geometries can sometimes necessitate variations in spray angle across the substrate. Substrate 12 can be a component of a gas turbine engine. Substrate 12 can be a nickel- or cobalt-based superalloy, a refractory alloy, or a ceramic matrix composite (CMC), among other materials. In some embodiments, coating system 10 can also include a bond coat (not shown), which can be applied to substrate 12 prior to coating deposition. The bond coat can be a diffusion or overlay bond coat including, for example, an aluminide or MCrAlY (where M can be iron, cobalt, or nickel) applied to substrate 12, as known in the art. In some embodiments, a surface of substrate 12 and/or the bond coat can be roughened, such as by grit blasting or peening, to improve adhesion of coating 14 or 16.

In some embodiments, inner coating 16 can be included to provide a layer of material chemically compatible with both substrate 12 and outer coating 14, when outer coating 14 is chemically incompatible with substrate 12. Inner coating 16 can improve adhesion between outer coating 14 and substrate 12. In some embodiments, inner coating 16 can have a total thickness less than outer coating 14. Both outer coating 14 and inner coating 16 can be designed to provide durability, toughness, and strain tolerance to coating system 10.

Both outer and inner coatings 14 and 16 can comprise a ceramic material, such as an oxide, and including but not limited to rare-earth zirconates, hafnates, or titanates, silicates, aluminates, or titanates as known in the art for producing thermal barrier coatings for high temperature applications, environmental barrier coatings, tribological or wear coatings, and thin-film solid oxide fuel cells, among others. Both outer and inner coatings 14 and 16 can be deposited using suspension plasma spraying, in which the ceramic particles are suspended in a liquid medium. In some embodiments, as shown in FIG. 1, columnar structures 22 of inner coating 16 can be more porous than columnar structures 18 of outer coating 14. Additionally, inter-columnar gaps 24 of inner coating 16 can be less defined than inter-columnar gaps 20 of outer coating 14.

During deposition of inner coating 16, partially or fully melted ceramic particles can impact a surface of substrate 12 or previously deposited particles. The particles can form both randomly oriented splats 13 and spheroids, which can be visible in a micrograph. Spheroids may be produced when the kinetic energy of the ceramic particle is less than the surface tension of the particle, which can allow the particle to generally maintain shape or be only minimally deformed upon impact. The majority of particles can solidify prior to or upon impact with substrate 12. As such, the particles can accumulate to form a microstructure with nanopores formed between adjacent particles. Preferential accumulation on substrate asperities can produce porous columnar structures 22 separated by relatively higher porosity inter-columnar porosity bands or gaps 24.

Figure 2:
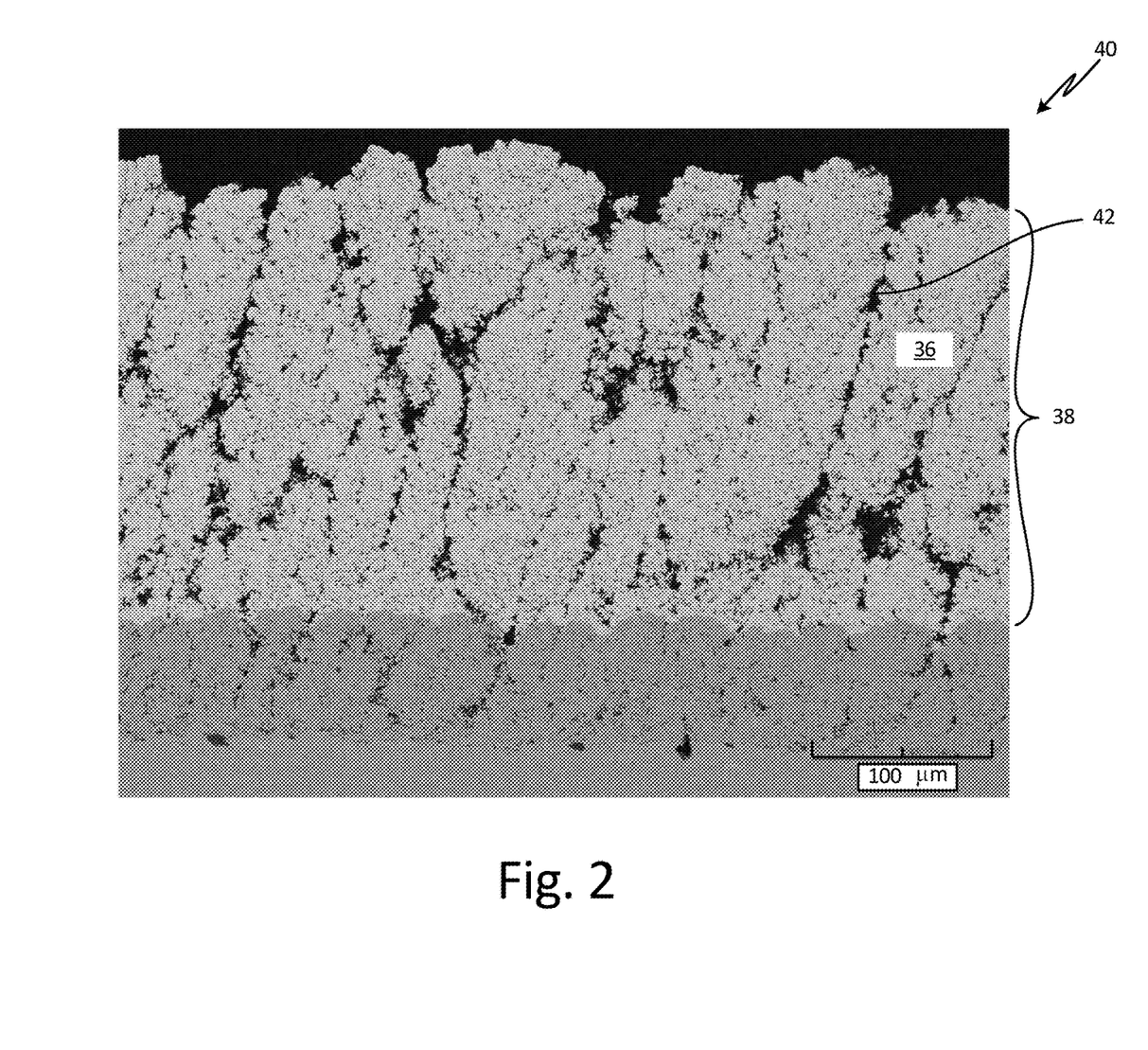
FIG. 2 is a perspective view of another coating.

Outer coating 14 can be designed to improve the durability and toughness of coating system 10. In addition to the deposition of conventional coating materials, which can solidify prior to or upon impact of substrate 12 or previously deposited particles, outer coating 14 can include a second material that can fill in nanopores, which would otherwise form between particles. In some embodiments, the second material may not immediately solidify and recrystallize upon impact. In some embodiments, the second material may retain substantial sintering energy and sinter outer ceramic coating 14 upon impact and with subsequent passes of the plasma torch as additional heat is applied. As shown in FIG. 1, adjacent dense and generally vertically-oriented columnar structures 18 can be separated by well-defined inter-columnar gaps 20. Inter-columnar gaps 20 can define voids in material accumulation that substantially separate adjacent columnar structures 18 along a total length of columnar structures 18. Columnar structures 18, formed by the deposition of two materials, can be contrasted with columnar structures 36 shown in FIG. 2, which were formed upon deposition of a single material to form outer coating 38 of coating system 40. Columnar structures 18 have a lower porosity than columnar structures 36, which is visible in comparison of the micrographs of FIGS. 1 and 2. Additionally, well-defined inter-columnar gaps 20 of coating system 10 (FIG. 1) can be contrasted with the inter-columnar gaps 42 of coating system 40, which define regions of relatively high porosity between adjacent columnar structures 36 of relatively lower porosity. As viewed in the micrograph of FIG. 1, inter-columnar gaps 20 can delineate distinct boundaries of adjacent columnar structures 18; whereas boundaries of adjacent columnar structures 36 can be unclear. The size and orientation of both columnar structures 18 and inter-columnar gaps 20 can be varied to provide a desired tolerance to both thermal and mechanical stresses (e.g., abrasion or rub). In some embodiments, e.g., wear coatings, larger inter-columnar gaps may be beneficial. In some embodiments, a plurality of inter-columnar gaps 20 can have a length equal to at least 80 percent of the total length of adjacent columnar structures 18 and a median width greater than 5 μm. As shown in FIG. 1, the microstructure of inner coating 16, which can be formed by deposition of a single material, can be similar to the microstructure of coating system 40, having a higher porosity than outer coating 14 and less defined inter-columnar gaps 24.

In one embodiment, outer coating 14 can include equal parts of gadolinium zirconate (GZO), which has a melting point of 2850° C., and gadolinium aluminate (GdAlO$_3$), which has a lower melting point of 2350° C. Both materials can be deposited simultaneously. The materials can be premixed or fed to the plasma spray torch from separate vessels at a predetermined rate. The GdAlO$_3$ can fill nanopores, which would otherwise form between adjacent GZO particles, to create columnar structures 18 having a porosity of less than four percent. In some embodiments, the porosity is less than three percent and in others, the porosity is less than 2.5 percent. As shown in FIG. 1, the highly dense columnar structures 18 remain separated by inter-columnar gaps 20 even as the theoretical density of columnar structures 18 approaches 100 percent (porosity nears zero percent). Inner coating 16 can be formed of yttrium-stabilized zirconia (YSZ).

Figure 3A:
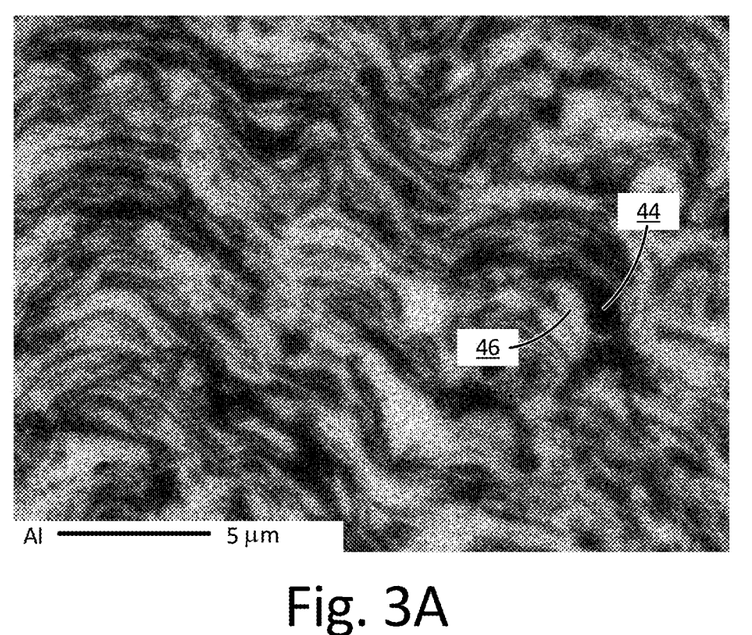
FIG. 3A is an x-ray map of a first material of the coating of FIG. 1.
Figure 3B:
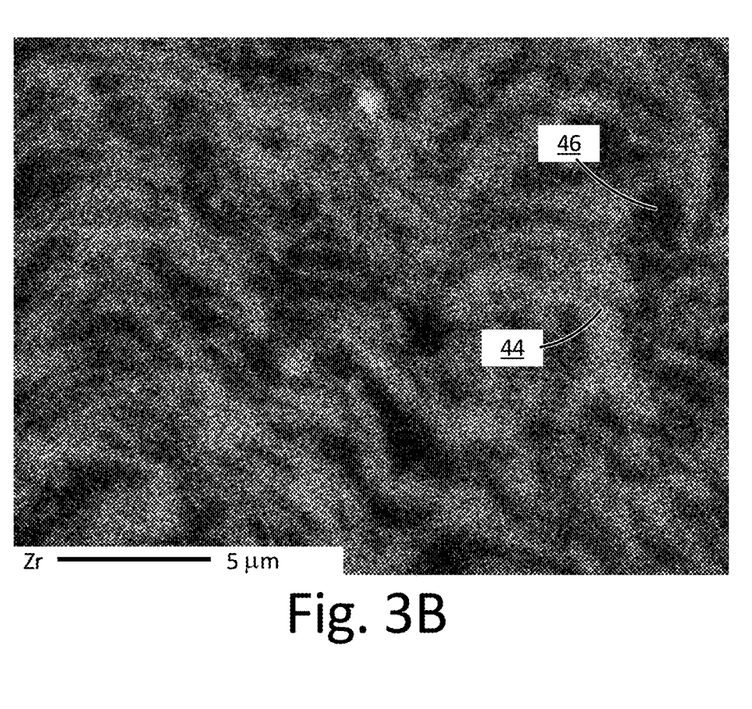
FIG. 3B is an x-ray map of a second material of the coating of FIG. 1.

FIGS. 3A and 3B are x-ray maps of aluminum and zirconium, which show the formation of discrete layers 44 and 46 of GZO and GdAlO$_3$, respectively, throughout the coating matrix, as represented by the elements (zirconium and aluminum) unique to each compound. Discrete layers 44 and 46 of GZO and GdAlO$_3$ can substantially correspond to a droplet size formed from plasma torch injectors. In some embodiments, discrete layers 44 and 46 can be approximately 1 μm. As shown in FIGS. 3A and 3B, discrete layers 44 and 46 of GZO and GdAlO$_3$ materials can be substantially evenly distributed throughout columnar structures 18. GZO can provide CMAS resistance in thermal barrier coatings. GdAlO$_3$, while increasing the density of outer coating 14, may provide additional durability improvements.

Figure 4:
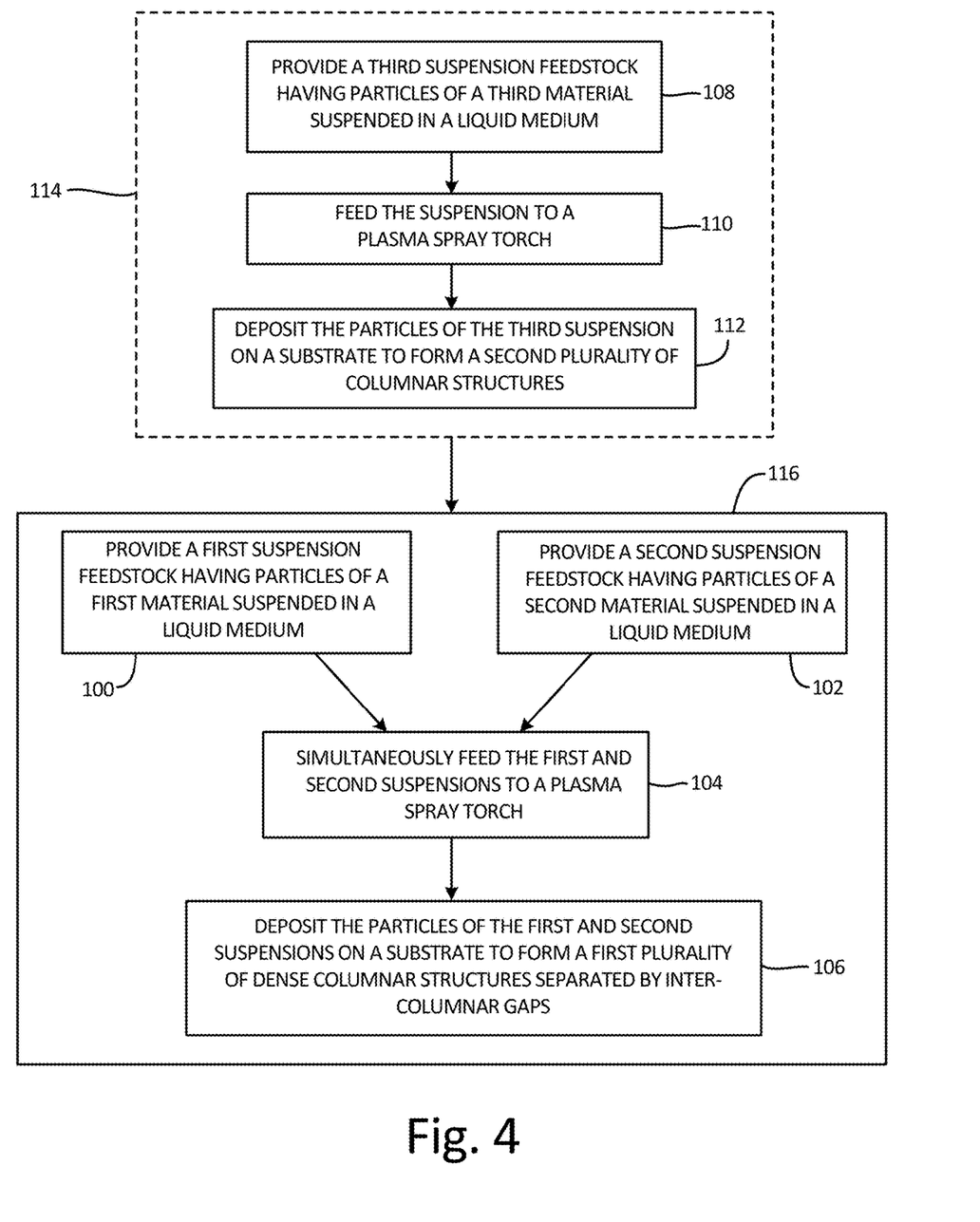
FIG. 4 is a diagram of steps for producing the coating of FIG. 1.

FIG. 4 provides a diagram of steps for producing coating system 10. As shown in FIG. 4, first and second suspensions can be provided having particles of first and second materials, respectively, suspended in liquid mediums (steps 100 and 102). The first and second suspensions can be simultaneously fed to a plasma spray torch (step 104), and deposited on a substrate to form a first plurality of dense columnar structures separated by inter-columnar gaps (step 106). In some embodiments, a suspension having particles of a third material can be suspended in a liquid medium (step 108), fed to a plasma spray torch (110), and deposited on a substrate to form a second plurality of columnar structures (112). The second plurality of columnar structures can form an inner coating 16 (step 114) to which outer coating 14 can be applied (step 116) following steps 100-106.

Example

FIGS. 1, 2A, and 2B show coatings deposited using a Progressive Surface 100HE™ plasma torch with a 9.5 mm diameter exit nozzle. Outer coating 14 was deposited with a torch power of 105 kW at a standoff distance of 63.5 mm. 25 wt % GZO particles, having a median particle diameter ($d_{50}$) of 0.5 μm, were suspended in ethanol and fed to the plasma torch at a rate of 45 ml/min. 25 wt % $GdAlO_3$ particles, having a median particle diameter ($d_{50}$) of 0.5 μm, were suspended in ethanol and fed to the plasma torch at a rate of 45 ml/min. GZO and $GdAlO_3$ suspensions were simultaneously injected from two different 230 μm orifices oriented approximately 30 degrees apart and impinging at the plasma torch exit center. Similar dense columnar structures were formed at torch powers of 95 kW and 85 kW and standoff distance of 76.2 and 88.9 mm, however, column diameter and inter-columnar porosity was increased with lower torch power and increased standoff distance. Resulting outer coating 14 is composed of discreet layers 44, 46 of GZO and $GdAlO_3$ of about 1 μm in size, which corresponds to a droplet size formed from the injectors. Columnar structures 18 have an intra-columnar porosity of 0.6 percent as determined by contrast in scanning electron microscopy at a magnification of 2500×. Columnar structure porosity was determined for an image taken at a mid-coating thickness and included all pores.

The incorporation of a second material capable of filling nanopores, which would otherwise form by conventional material particles in a liquid carrier plasma spray technique can produce strain-tolerant coatings having high density columnar structures. The incorporation of the second material can increase the density of the coating matrix above that which has been obtained with single and mixed material coatings in the prior art while still retaining columnar structures formed by preferential material accumulation. Increasing material density while preserving the columnar structures can improve coating durability and toughness, while maintaining the improved strain tolerance provided by the inter-columnar gaps.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transient alignment or shape variations induced by thermal, rotational or vibrational operational conditions and the like. Moreover, any relative terms or terms of degree used herein should be interpreted to encompass a range that expressly includes the designated quality, characteristic, parameter or value, without variation, as if no qualifying relative term or term of degree were utilized in the given disclosure or recitation.

Discussion of Possible Embodiments

The following are non-exclusive descriptions of possible embodiments of the present invention.

A strain-tolerant coating for use in gas turbine engines can include a plurality of dense, generally vertically-oriented columnar structures formed during deposition by preferential material accumulation, and a plurality of inter-columnar gaps separating the columnar structures. The columnar structures can include a plurality of randomly-oriented particle splats and can have a porosity of less than four percent.

The strain-tolerant coating of the preceding paragraph can optionally include, additionally and/or alternatively, any one or more of the following features, configurations and/or additional components:

The strain-tolerant coating of the preceding paragraphs, wherein the columnar structures can have a porosity of less than three percent.

The strain-tolerant coating of any of the preceding paragraphs, wherein the columnar structures can include a first material and a second material, which can be different than the first material.

The strain-tolerant coating of any of the preceding paragraphs, wherein the columnar structures can include a plurality of discrete layers of the first material and a plurality of discrete layers of the second material.

The strain-tolerant coating of any of the preceding paragraphs, wherein the first and second materials can be substantially evenly distributed throughout the columnar structures.

The strain-tolerant coating of any of the preceding paragraphs, wherein the first material can have a first melting point, and the second material can have a second melting point that is less than the first melting point.

The strain-tolerant coating of any of the preceding paragraphs, wherein the first material can be gadolinium zirconate.

The strain-tolerant coating of any of the preceding paragraphs, wherein the second material can be gadolinium aluminate.

The strain-tolerant coating of any of the preceding paragraphs, wherein the columnar structures can comprise 50 percent gadolinium zirconate and 50 percent gadolinium aluminate.

The strain-tolerant coating of any of the preceding paragraphs, wherein the plurality of columnar structures can constitute a first plurality of columnar structures and the plurality of inter-columnar gaps can constitute a first plurality of inter-columnar gaps. The first plurality of columnar structures and first plurality of inter-columnar gaps can be located in an outermost section of the coating. The coating can further include an innermost section, including a second plurality of generally vertically-oriented columnar structures formed during deposition by material accumulation and having randomly-oriented particle splats, and a second plurality of inter-columnar gaps separating the second plurality of columnar structures.

The strain-tolerant coating of any of the preceding paragraphs, wherein the coating can have a total thickness, which includes a total thickness of the outermost section and a total thickness of the innermost section, with the total thickness of the innermost section being less than the total thickness of the outermost section.

The strain-tolerant coating of any of the preceding paragraphs, wherein the inter-columnar gaps of the first plurality of inter-columnar gaps can define voids in material accumulation that substantially separate adjacent columnar structures along a total length of the columnar structures.

The strain-tolerant coating of any of the preceding paragraphs, wherein the inter-columnar gaps can extend a length equal to at least 80 percent of the total length of the columnar structures.

A method of forming a strain-tolerant coating can include providing first and second suspension feedstocks, simultaneously feeding the first and second suspension feedstocks to a plasma spray torch, and depositing the particles of the first and second suspension feedstocks on a substrate to form a first plurality of columnar structures of preferential material accumulation. The first suspension has particles of a first material suspended in a liquid medium. The second suspension has particles of a second material, different from the first material, suspended in a liquid medium. The columnar structures of the first plurality of columnar structures have a porosity of less than four percent.

The method of the preceding paragraph can optionally include, additionally and/or alternatively, any one or more of the following features, configurations and/or additional steps:

The method of the preceding paragraphs can further include forming inter-columnar gaps, wherein the inter-columnar gaps define voids in material accumulation that substantially separate adjacent columnar structures along a total length of the columnar structures.

The method of any of the preceding paragraphs, wherein the first material can have a first melting point and the second material can have a second melting point that is less than the first melting point.

The method of any of the preceding paragraphs, wherein the first material can be gadolinium zirconate.

The method of any of the preceding paragraphs, wherein the second material can be gadolinium aluminate.

The method of any of the preceding paragraphs can further include providing a third suspension feedstock comprising particles of a third material suspended in a liquid medium, which can be fed to a plasma spray torch and deposited on the substrate to form a second plurality of columnar structures of preferential material accumulation. The second plurality of columnar structures can make up an inner coating and the first plurality of columnar structures can make up an outer coating.

The method of any of the preceding paragraphs, wherein the third material can be yttrium stabilized zirconia.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A strain-tolerant coating for use in gas turbine engines, the coating comprising:
   a plurality of dense, generally vertically-oriented columnar structures formed during deposition by preferential material accumulation, the columnar structures forming a first coating layer having a first total vertical thickness and comprising:
      a plurality of randomly-oriented particle splats formed from a first material;
      a second material disposed in pores formed between particle splats of the first material, wherein the second material is different from the first material, wherein each of the first and second materials is distributed throughout the first total vertical thickness of the first coating layer; and
      a porosity of less than four percent; and
   a plurality of inter-columnar gaps separating the columnar structures.

2. The strain-tolerant coating of claim 1, wherein the columnar structures have a porosity of less than three percent.

3. The strain-tolerant coating of claim 2, wherein the columnar structures comprise:
   a plurality of discrete layers of the first material; and
   a plurality of discrete layers of the second material.

4. The strain-tolerant coating of claim 2, wherein each of the first and second materials is substantially evenly distributed throughout the columnar structures.

5. The strain-tolerant coating of claim 2, wherein the first material has a first melting point, and the second material has a second melting point less than the first melting point.

6. The strain-tolerant coating of claim 2, wherein the first material comprises gadolinium zirconate.

7. The strain-tolerant coating of claim 6, wherein the second material comprises gadolinium aluminate.

8. The strain-tolerant coating of claim 7, wherein the columnar structures comprise 50 percent gadolinium zirconate and 50 percent gadolinium aluminate.

9. The strain-tolerant coating of claim 1, wherein the plurality of columnar structures constitute a first plurality of columnar structures and the plurality of inter-columnar gaps constitute a first plurality of inter-columnar gaps, and wherein the coating further comprises an innermost section comprising:
   a second plurality of generally vertically-oriented columnar structures formed during deposition by material accumulation, the second plurality of columnar structures form a second coating layer having a second total vertical thickness and comprise randomly-oriented particle splats; and
   a second plurality of inter-columnar gaps separating columnar structures of the second plurality of columnar structures,
   wherein the first coating layer is located in an outermost section of the coating and the second coating layer is located in an innermost section of the coating.

10. The strain-tolerant coating of claim 9, wherein coating has a total thickness comprising the first total vertical thickness of the first coating layer and the second total vertical thickness of the second coating layer, wherein the second total vertical thickness is less than the first total vertical thickness.

11. The strain-tolerant coating of claim 9, wherein the inter-columnar gaps of the first plurality of inter-columnar gaps define voids in material accumulation that substantially separate adjacent columnar structures along a total length of the columnar structures.

12. The strain-tolerant coating of claim 11, wherein the inter-columnar gaps extend a length equal to at least 80 percent of the total length of the columnar structures.

13. A method of forming a strain-tolerant coating, the method comprising:
   providing a first suspension feedstock comprising particles of a first material suspended in a liquid medium;

providing a second suspension feedstock comprising particles of a second material suspended in a liquid medium, wherein the second material is different from the first material;

simultaneously feeding the first and second suspension feedstocks to a plasma spray torch; and depositing the particles of the first and second suspension feedstocks on a substrate to form a first plurality of columnar structures of preferential material accumulation, the first plurality of columnar structures forming a first coating layer having a first total thickness and comprising a plurality of randomly-oriented particle splats formed from the first material with the second material disposed in pores formed between particle splats of the first material, wherein each of the first and second materials are distributed in throughout the total thickness of the first layer, and wherein columnar structures of the first plurality of columnar structures have a porosity of less than four percent; and forming inter-columnar gaps that separate the columnar structures of the first plurality of columnar structures.

14. The method of claim 13, wherein the inter-columnar gaps define voids in material accumulation that substantially separate adjacent columnar structures along a total length of the columnar structures.

15. The method of claim 13, wherein the first material has a first melting point and the second material has a second melting point, wherein the second melting point is less than the first melting point.

16. The method of claim 15, wherein the first material comprises gadolinium zirconate.

17. The method of claim 16, wherein the second material comprises gadolinium aluminate.

18. The method of claim 13 and further comprising:

providing a third suspension feedstock comprising particles of a third material suspended in a liquid medium;

feeding the third suspension feedstock to a plasma spray torch; and depositing the particles of the third suspension feedstock on the substrate to form a second plurality of columnar structures of preferential material accumulation, wherein the second plurality of columnar structures make up an inner coating and the first plurality of columnar structures make up an outer coating.

19. The method of claim 18, wherein the third material comprises yttrium stabilized zirconia.

20. A strain-tolerant coating for use in gas turbine engines, the coating comprising:

a plurality of dense, generally vertically-oriented columnar structures formed during deposition by preferential material accumulation, wherein the columnar structures are formed from gadolinium zirconate and gadolinium aluminate and comprise a plurality of randomly-oriented particle splats and, wherein the columnar structures have a porosity of less than four percent; and a plurality of inter-columnar gaps separating the columnar structures.

* * * * *

UNITED STATES PATENT AND TRADEMARK OFFICE
CERTIFICATE OF CORRECTION

PATENT NO. : 10,550,462 B1  
APPLICATION NO. : 15/699265  
DATED : February 4, 2020  
INVENTOR(S) : Kaylan M. Wessels et al.

Page 1 of 1

It is certified that error appears in the above-identified patent and that said Letters Patent is hereby corrected as shown below:

Column 8, Line 36-37, Claim 9:
Delete "an innermost section comprising"

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*